United States Patent [19]

Polivka

[11] Patent Number: 5,736,166
[45] Date of Patent: Apr. 7, 1998

[54] FLOW-THROUGH APPARATUS FOR LINING OF PIPELINES

[75] Inventor: Richard Carl Polivka, Lemont, Ill.

[73] Assignee: Insituform (Netherlands) B.V., Netherlands

[21] Appl. No.: 661,832

[22] Filed: Jun. 11, 1996

[51] Int. Cl.⁶ .................................................. B29C 63/36
[52] U.S. Cl. ........................ 425/11; 138/97; 156/287; 156/294; 264/269; 264/516; 425/387.1; 425/392; 425/503
[58] Field of Search .......................... 425/11, 387.1, 425/392, 503; 264/36, 269, 516, 573; 138/97; 156/94, 287, 294

[56] References Cited

U.S. PATENT DOCUMENTS

| | | | |
|---|---|---|---|
| 4,980,116 | 12/1990 | Driver | 264/516 |
| 5,154,936 | 10/1992 | Driver et al. | 425/182 |
| 5,393,481 | 2/1995 | Wood | 264/516 |
| 5,399,301 | 3/1995 | Menendez et al. | 264/36 |
| 5,597,353 | 1/1997 | Alexander, Jr. | 425/387.1 |

*Primary Examiner*—James P. Mackey
*Attorney, Agent, or Firm*—Cowan, Liebowitz & Latman, P.C.; Michael L Wolfson

[57] ABSTRACT

A flow-through device for use during the installation of an inverted resin impregnated flexible tubular liner in a passageway permitting the flow of fluids through the liner during the curing portion of the installation process is provided. A cylindrical body has an expandable bladder interior sealingly attached to the interior of the tubular body to form a pressure chamber is attached to the trailing end of the liner. Pressurized fluid is supplied to the chamber to inflate the bladder to close the end of the liner. The bladder allows flow through the passageway during curing of the liner, when the effluent pressure exceeds the pressure in the bladder.

8 Claims, 6 Drawing Sheets

FLOW-THROUGH APPARATUS FOR LINING OF PIPELINES

BACKGROUND OF THE INVENTION

The invention relates to installation of a cured-in-place liner within the interior of an existing conduit or pipeline, such as a sewer pipe, and more particularly to installation of a curable resin impregnated flexible liner while maintaining effluent flow through the conduit or passageway during most of the curing process.

It is generally well known that conduits or pipelines, particularly underground pipes, such as sanitary sewer pipes, storm sewer pipes, water lines and gas lines, that are employed for conducting fluids, frequently require repair due to fluid leakage. The leakage may be inward, from the environment into the interior or conducting part of the pipe, or outward, from the conducting part of the pipe into the surrounding environment. Leakage of this type may be due to improper initial installation of the pipe, deterioration of the pipe itself due to normal aging or to the effects of conveying corrosive or abrasive materials, cracking of the pipe or of pipe joints due to environmental conditions such as earthquakes, the movement of large vehicles or similar natural or man made vibrations, or any other such causes. Regardless of the cause, such leakage is undesirable and may result in waste of the fluid being conveyed by the pipe, damage to the surrounding environment and the possible creation of dangerous public health hazards.

Because of increasing labor and machinery costs, it has become increasingly more difficult and less economical to dig up and replace underground pipes, or portions or sections of such underground pipes, that may be leaking. As a result, various methods have been devised for the in situ repair or rehabilitation of the existing pipes, thereby avoiding the expenses and hazards associated with digging up and replacing the pipes or pipe sections. One of the more successful pipe repair or rehabilitation processes is the Insituform® Process and is described in U.S. Pat. No. 4,009,063 for METHOD OF LINING A PIPE and U.S. Pat. No. 4,064,211 for LINING OF PASSAGEWAYS, both to Eric Wood, the contents of which are incorporated herein by reference.

Briefly, in the Insituform® Process, an elongated flexible tubular liner of a felt fabric, foam or similar resin impregnable material that has been impregnated with a thermosetting synthetic catalyzed resin is installed within the existing pipe. The impregnated liner may be pulled into the conduit by a rope or cable, and a fluid impermeable inflation bladder or tube is then exerted within the liner. Generally, however, the liner is installed utilizing an inverting (or everting) process, as described in the latter patent.

The flexible tubular liners generally have a smooth layer of relatively flexible, substantially impermeable material coating the outside of the liner in its initial state. This impermeable layer ends up on the inside of the liner after the liner is inverted. As the flexible liner is installed in place within the existing pipeline, the liner is pressurized from within, preferably utilizing a fluid such as water. The water forces the liner to roll inside out in the pipeline and fills the inside of the liner pressing it radially outwardly to engage and conform to the interior surface of the pipe. The resin is then cured to form a hard, tight fitting, rigid pipe lining that effectively seals any cracks and that repairs any pipe or pipe joint deterioration in order to prevent further leakage either into or out of the pipe. The cured resin liner also serves to strengthen the existing pipe walls so as to provide added structural support.

After the liner has been everted into the passageway, heated fluid is circulated through the liner in order to cure the resin. This is usually done by pulling a so-called lay-flat hose into the everted liner by attaching it to the trailing end to carry it to the distal end of the liner. Heated water is then fed through that hose to the far end of the everted liner. A suction hose is used to return the water to the water heater.

When installing a liner, such as in the Insituform® process, it is necessary to divert or bypass the sewage which normally flows through the sewer. This is usually done by pumping the sewage through a bypass pipe which is taken to ground level, and the sewage is returned to the sewer at a position downstream of the section of the sewer pipe which is being lined. Performing this operation is expensive, difficult and risky in the case of large diameter sewers. The cost of bypass pumping in such circumstances tends to be a large proportion of the overall cost of the rehabilitation process.

The routing of the bypass pipe in itself presents a difficulty, keeping in mind that at ground level there will not only be the requirement to keep the bypass pipe clear of traffic and pedestrians, but additionally there will be equipment and apparatus at the site to perform the lining process, and the bypass pipe must be carefully positioned. A particular difficult situation arises when the bypass pipe must traverse a highway intersection. When the pipe is of small diameter, i.e. of the order of 4 to 6", it is a simple matter to provide vehicle and pedestrian ramps over the bypass pipe, but obviously if the pipe is of larger diameter, e.g. of the order of 12", this solution is not available. Some suggested alternatives have been proposed, such as bypassing around the installed tube as in U.S. Pat. No. 4,980,116 to Driver, the contents of which are incorporated here. While this suggestion is effective for some uses, it is difficult to use in many installations.

Accordingly, it is desirable to provide an improved method and apparatus for the installation of cured in place lining of a conduit or passageway which allows for flow through during most of the cure step of the installation and which overcomes these limitations. By utilizing the bladder device constructed and arrange in accordance with the invention, the difficulties of bypass pumping while curing takes place are substantially reduced.

SUMMARY OF THE INVENTION

Generally speaking, in accordance with the invention, an improved flow-through device and method for everting a liner or tube for rehabilitating an existing conduit or passageway are provided. The flow-through device constructed and arranged in accordance with the invention is installed at the trailing end of an everting liner. The flow-through device includes a cylinder having an outer diameter smaller than the inner diameter of the passageway to be relined, with an inner expandable/inflatable bladder in the form of a sphincter valve. The cylinder has an air inlet connected to either the upstream or down stream end of the pipeline to inflate the bladder. When the liner is being everted, the bladder is expanded to close the end of the everting liner and allows for the eversion in the usual manner.

During the curing step, the pressure in the bladder is set to the proper level to ensure that the liner conforms to the conduit or passageway being lined. The normal flow of the conduit is pumped into the liner. When the pressure within the liner exceeds the bladder pressure, the passage way in the bladder is forced open and allows the effluent to pass through. If the pressure within the liner drops below the pressure within the bladder, the passageway in the bladder closes until the pressure in the liner exceeds that of the bladder. The device with its expandable/inflatable bladder provides for effective continued flow through the conduit during most of the curing process.

Accordingly, it is an object of the invention to provide a tube or liner with a flow-through device that allows effective flow-through during installation.

Another object of the invention is to provide an apparatus to act as a pressure valve for maintaining proper pressure inside an everted liner during the curing process.

A further object of the invention is to provide a method for installation of a flexible resin impregnated liner in an existing conduit and provide for flow-through during most of the installation.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and the arrangement of parts which are adapted to effect such steps and constructions, all exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 is a schematic illustration in elevation of a liner with flow-through device installed in passageway with the device partially opened to allow for flow-through.

DESCRIPTION OF THE PREFERRED EMBODIMENT

Figure 1:
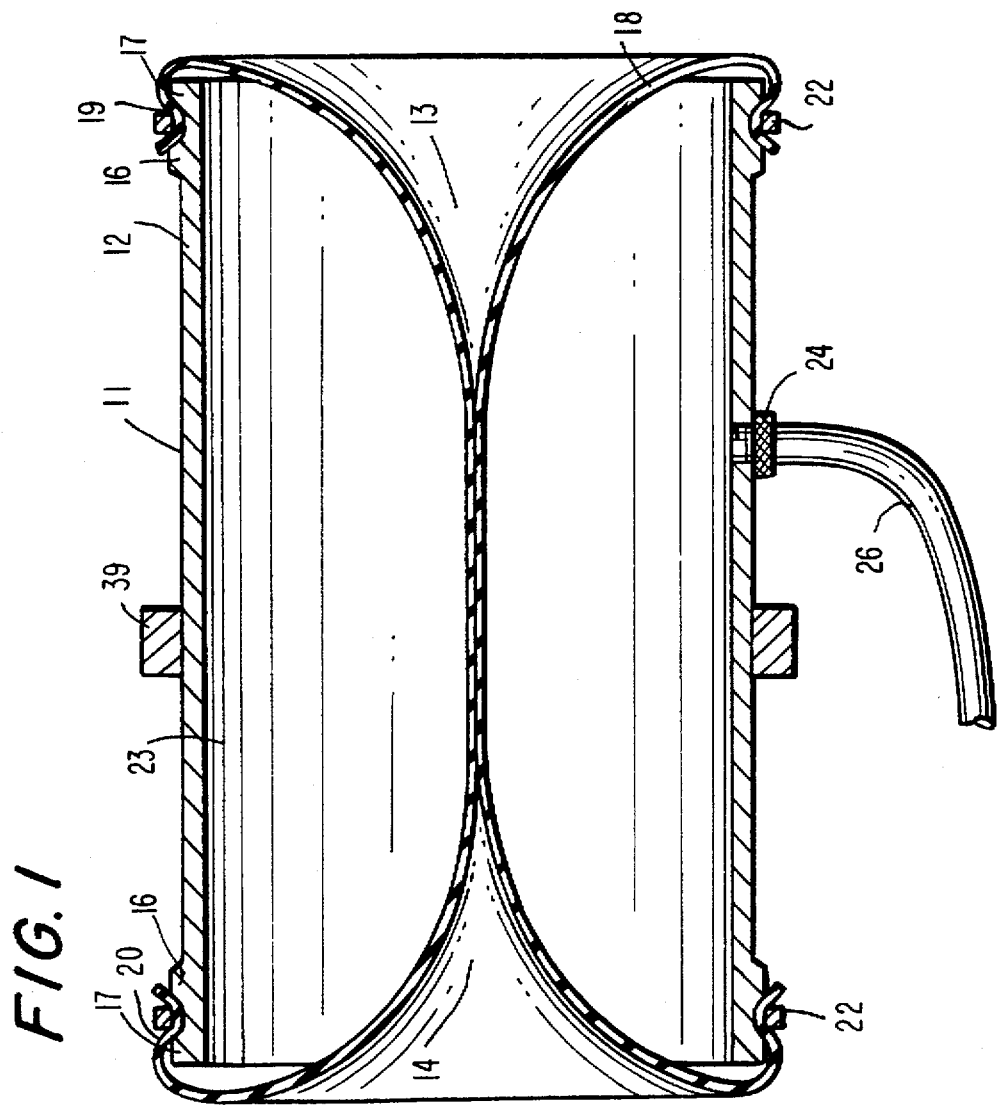
FIG. 1 is a cross-sectional view of the flow-through device constructed and arranged in accordance with the invention.

FIG. 1 is a cross-section of a flow-through bladder device identified generally as 11 for installation in a flexible cured in place liner for lining a passageway or conduit. Flow-through device 11 includes a rigid tubular body 12 with an outer diameter less than the diameter of the passageway or conduit being relined. This will permit passage of device 11 through the passageway or conduit during the installation process. The exact dimension is not critical, but the outer diameter must be small enough to be easily inserted into the passageway, but large enough so it can function efficiently as a controllable flow-through device during installation and curing.

Tubular body 12 is formed of a rigid material, such as an aluminum or plastic pipe that is strong enough and rigid enough to substantially maintain its shape while withstanding the installation process and act to maintain the pressure inside an everting liner. The typical head of water required to evert an 8-inch liner is approximately 23 feet. Tubular body 12 has an inlet end 13 at the side facing the inlet end of the passageway or conduit and an opposing outlet or downstream end 14. The outer surface of each end 13 and 14 of tubular body 12 is formed with ribs 16 and 17, for mounting a flexible inflation bladder 18.

Cylindrical flexible inflation bladder 18 is disposed inside tubular body 12 where ends 19 and 20 are cuffed back over tubular body 12 at both ends 13, 14 and are attached between ribs 16 and 17 by bands 22. This is a preferred means of attaching bladder 18, but any suitable means, such as by fasteners and adhesives are suitable.

Figure 5:
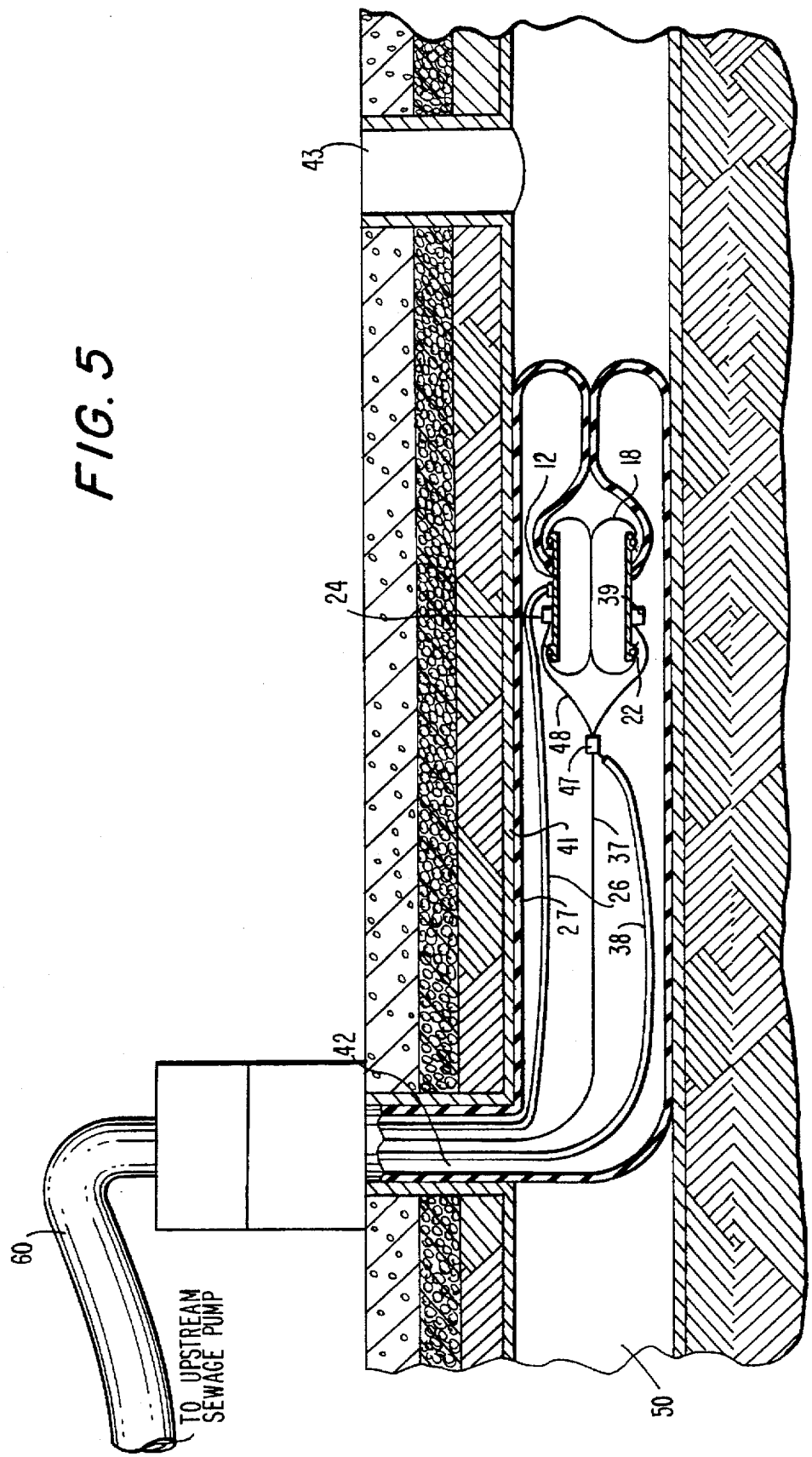
FIG. 5 is a schematic illustration in elevation of the flow-through device of the invention during insertion into a passageway showing the device closed.
Figure 6:
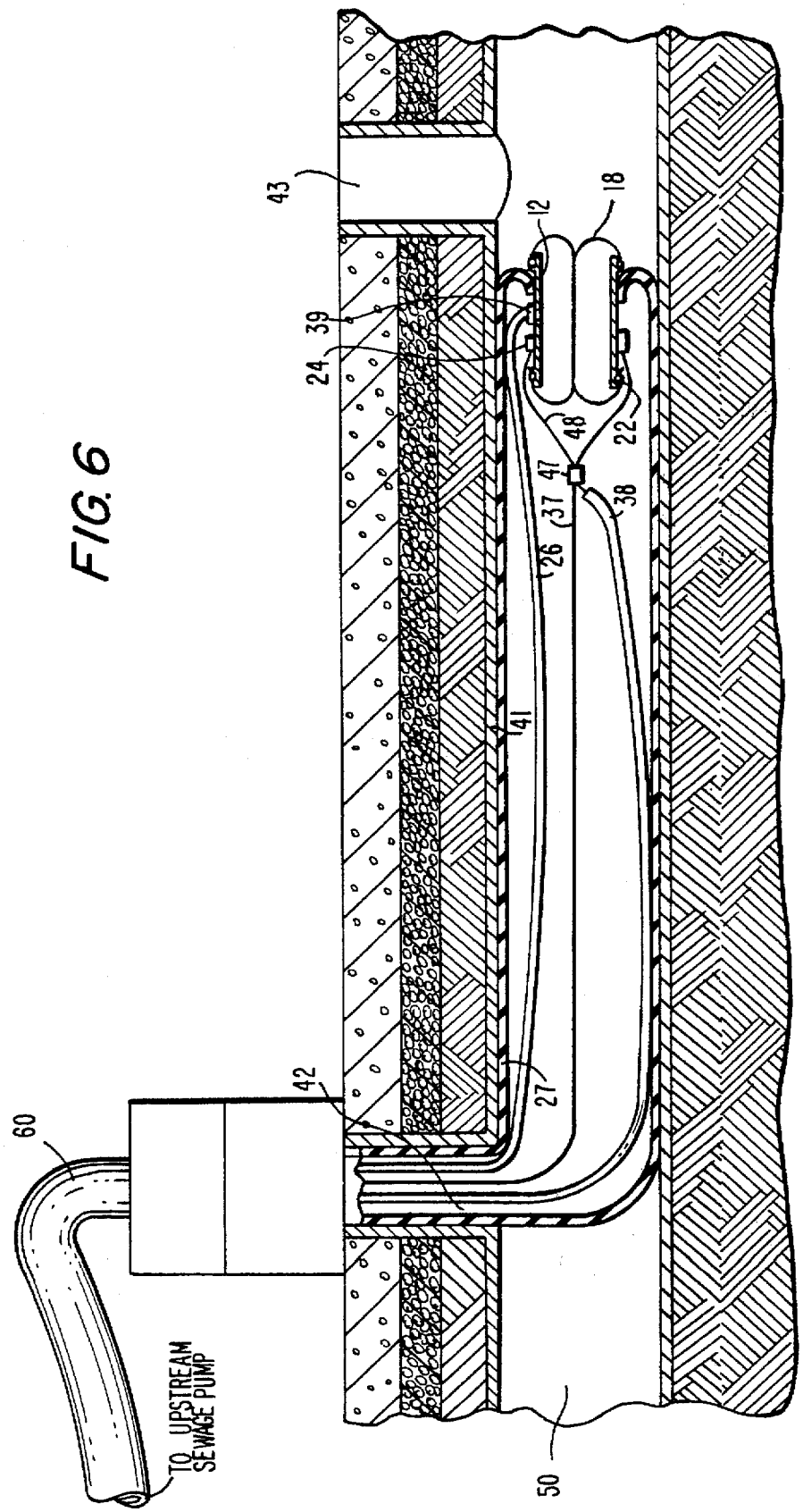

When bladder 18 is installed in a sealed manner against tubular body 12 at ends 13, 14 by bands 22 it forms a pressure chamber 23. A fluid supply (not shown), such as an air pump, is connected to a fluid supply inlet 24 for pumping pressurized fluid, such as air, into pressure chamber 23 through an air hose 26. FIGS. 2–6 show device 11 installed at the trailing end of a flexible curable resin impregnated liner 27. In FIG. 5, air supply inlet 24 is positioned on the upstream side of tubular body 12. This allows air hose 26 (not shown in FIG. 4) to trail flow-through device 11 as it is pulled through everting liner 27 during installation. As shown in FIGS. 5–6, air hose 26 is sufficiently long enough to connect to an air supply means at an upstream manhole after liner 27 is fully everted. Air is supplied to expand bladder 18 fully during the installation process to provide a sealed end to maintain pressure in liner 27 until it is fully everted.

Figure 4:
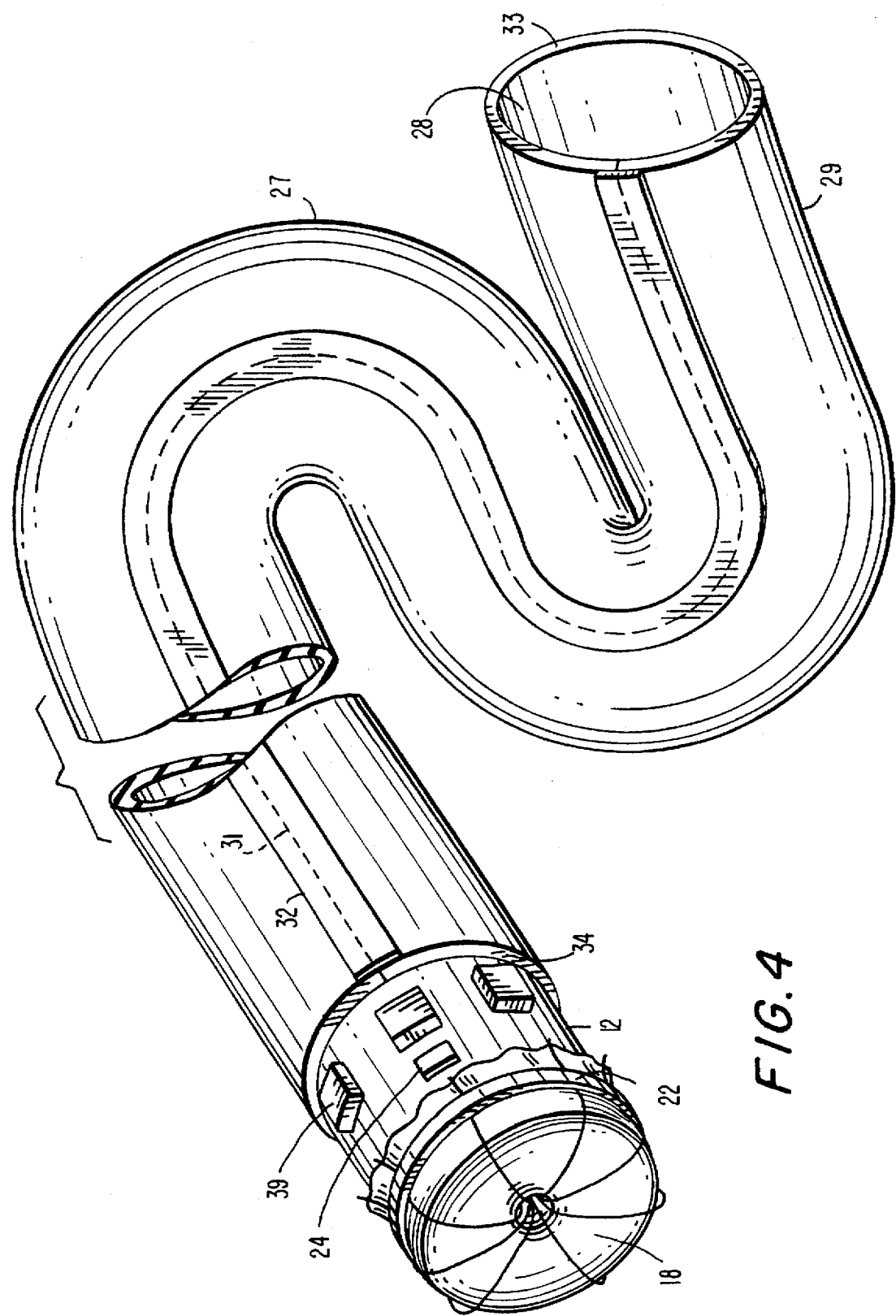
FIG. 4 is a perspective view of a flexible lining tube and flow-through device suitable for use in accordance with the invention.

FIG. 4 illustrates a flexible resin impregnated liner 27 for lining a pipeline in accordance with the invention. Liner 27 is generally formed of a fibrous material layer 28, such as a needled felt which has on its outer surface an impermeable film 29. Felt layer 28 and film 29 may be joined in sheet form and are formed into tubular liners by a line of stitching 31 or bonding with adhesive or flame. In this embodiment, this seam 31 is covered with a sealing tape 32. An example of a process for manufacturing a furnished liner is shown in U.S. Pat. No. 4,446,181, the contents of which are incorporated herein by reference. Liner 27 has an upstream end 33 which is fixed during the inversion with flow-through device 11 fixed to opposite downstream end 34.

Figure 2:
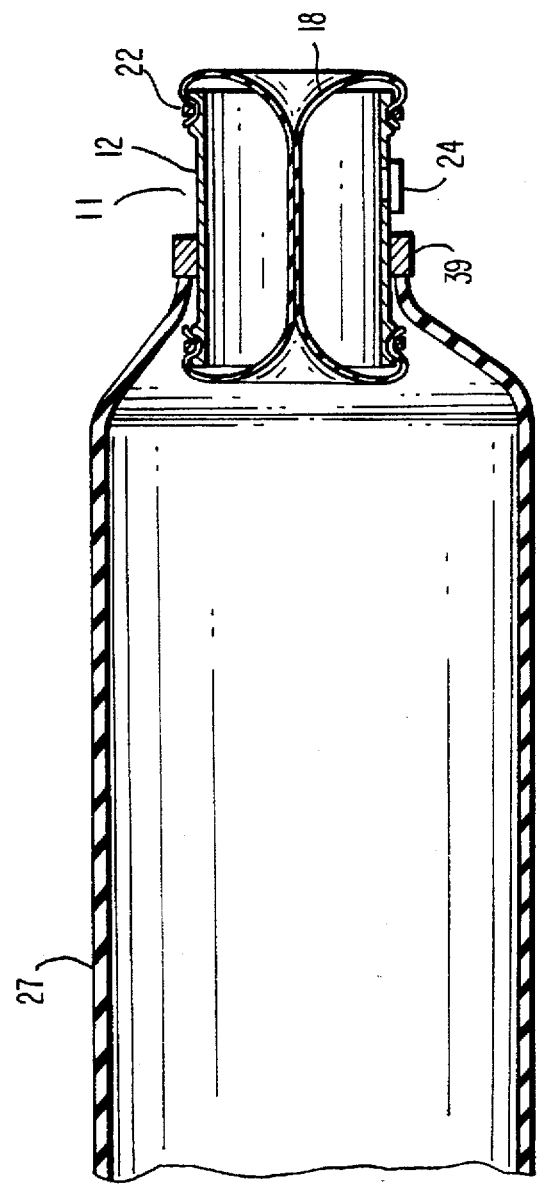
FIG. 2 is a cross-sectional view of the flow-through device of FIG. 1 installed on the trailing end of a flexible liner.
Figure 3:
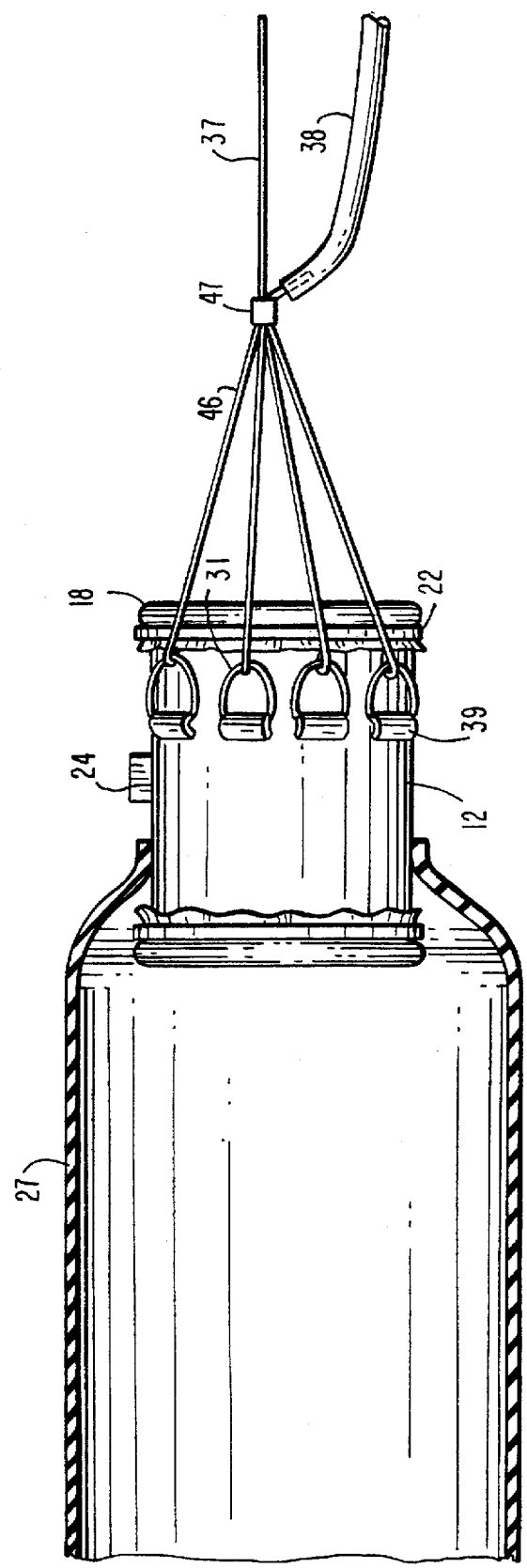
FIG. 3 is an elevational view of the liner with flow-through device of FIG. 2 with holdback anchors installed.

Flow-through device 11 is mounted to downstream end 34 of liner 27 by suitable means, such as a strap (not shown) or by an adhesive prior to the eversion of the liner into the conduit as shown in FIG. 2. Bands or strips of synthetic material or metal which are sufficiently strong to withstand the pressure applied to the liner during the eversion process are used for the straps. In a preferred embodiment of the invention, liner 27 is tapered to the side of flow-through device 11 as shown in FIG. 2. In FIG. 6, air supply inlet 24 is upstream of the attachment of liner 27. In this embodiment, air hose 26 is pulled through liner 27 as it is everted, then connected to air pressure means. Air supply inlet 24 is preferably positioned on tubular body 12 in a manner to allow air supply hose 26 to trail flow-through device 11 with a hold-back rope or cable 37 used to control the eversion speed. FIGS. 5 and 6 shows flow-through device 11 secured to the end of fully everted liner 27 with air hose 26, hold-back rope 37 and a recirculation hose 38 for providing hot water for curing the resin trailing behind within everted liner 27.

In another embodiment of the invention (not shown), the air supply inlet is positioned on the tubular body downstream side of the liner attachment. In this embodiment, the bladder is inflated with an air supply hose sufficiently to close and seal the end of the liner during the eversion process. After the liner has been fully everted, an air supply hose is connected to the air supply inlet from a downstream access to the passageway or conduit, likely a downstream manhole. The pressure within the bladder is then controlled to maintain pressure within the everted liner and to allow flow-through the passageway or conduit as necessary.

The "feed rate" of the liner as it is being everted is controlled by restraining the trailing end of the resin-impregnated liner as it is everted into the conduit using a cable or hold-back rope. By restraining the trailing or uneverted end of the liner, the liner does not evert too quickly, thereby ensuring that the liner unfolds properly while maintaining the pressure within the liner. Various means have been proposed to secure a hold-back rope or cable to the trailing end of the liner for restraining the trailing end of the liner and for distributing the pulling stress over the entire width of the end of the liner.

In a preferred embodiment, hold back rope 37 is attached to flow-through device 11 prior to the eversion process. Recirculation hose 38 may also be attached to flow-through device 11 by coupling to holdback anchors 39. Hold-back rope 37 and recirculation hose 38 may both be connected to a coupling 47. Coupling 47 is connected to the anchors 39 by a plurality of ropes 46. Alternately, the hold-back rope 37 and the recirculation hose 38 may be connected directly to anchors 39. As liner 27 everts into a passageway or conduit, recirculation hose 38 and flow-through device 11 are drawn through the everting liner with air hose 26. When liner 27 is fully everted into a existing sewer line 41, as shown in FIG. 6, flow-through device 11 is at the downstream end with recirculation hose 38 attached. Hot water is then pumped into the interior of everted liner 27 thus causing the resin in liner 27 to cure. Impermeable coating 29 which is now on the inside of liner 27 after inversion contains the hot curing water which is circulated by recirculation hose 38. Alternatively, liner 27 can be everted with the effluent if fibrous layer 28 is impregnated with an ambient cure resin.

Referring to FIGS. 5 and 6, the section of existing sewer line 41 to be lined with resin impregnated lining 27 of the type discussed above is shown. The section of sewer line 41 to be lined extends between an upstream manhole 42 and a downstream manhole 43. A flow through plug is installed at a manhole upstream of manhole 42 and sewage is then pumped out and carried by a bypass line 60. When liner 27 is everting in sewer line 41, effluent is redirected by bypass line 60 into the upstream end of liner 27 at manhole 42. This aids in the eversion of the liner 27. When the eversion of liner 27 is completed the sealing pressure in bladder 18 is adjusted to the pressure used to cure the liner. Effluent is continued to be pumped through access in upstream manhole 42. Thus, during the time while the curing is taking place, which can be several hours, the effluent is pumped into the upstream end of everted liner 27. When the pressure in the liner exceeds the sealing pressure in bladder 18, bladder 18 is forced open and flow through begins. Completion of the lining operation occurs when the resin in the layer or layers has cured to hard condition, after which the hydraulic pressure maintaining the lining tube against the sewer surface can be removed.

It will be seen from the above that through the use of the procedure there disclosed, the lining of lengths of pipe which are actively engaged in conveying effluent can be accomplished by the effluent directing into the liner during a portion of the installation process. Moreover, the use of the method here disclosed does not require any significant modification of the basic lining procedure, and is adaptable to different lining procedures. Included in these procedures is the pull-in and inflate method described in U.S. Pat. No. 4,009,063. Here, a pulling rope is anchored to the downstream end of the tubular body and after pressurizing the bladder, and inserting the liner, an inflating fluid is fed into the liner to expand it against the conduit.

It will be seen that the objects set forth above, among those made apparent from the preceding description, are efficiently attained and, since certain changes may be made in carrying out the method and in the apparatus set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features herein and described and all statements of the scope of the invention which, as a matter of language, might be said to fall therebetween.

What is claimed is:

1. An apparatus for allowing flow through when lining a conduit or passageway with a curable resin impregnated flexible liner using a fluid medium under pressure to install the lining, comprising:

(a) a substantially rigid hollow tubular body with an upstream side adjacent an inlet end, a downstream side adjacent an outlet end, and a passage therethrough;

(b) a flexible bladder sealably mounted to the interior of the tubular body for forming a pressure chamber between the tubular body and bladder; and (c) fluid pressure inlet means for providing pressurized fluid to the chamber to inflate the bladder within the tubular body sufficient to close the passage through the tubular body and allowing effluent to flow through the passage defined by the flexible bladder when effluent pressure within the liner exceeds the pressure within the pressure chamber.

2. The apparatus for use in lining a conduit of claim 1, further including attachment means on the outer surface of the tubular body for attachment of a holdback rope or pulling rope.

3. The apparatus for use in lining a conduit of claim 2, wherein the attachment means is disposed on the upstream side of the tubular body.

4. The apparatus for use in lining a conduit of claim 2, wherein the attachment means is disposed on the downstream side of the tubular body.

5. The apparatus for use in lining a conduit of claim 1, further including means for securing one end of a liner about one end of the tubular body.

6. The apparatus for use in lining a conduit of claim 5, wherein the means for securing a liner includes ribs about the outside of the tubular body.

7. The apparatus for use in lining a conduit or passageway of claim 1, wherein the fluid pressure inlet means is disposed on the upstream side of the tubular body.

8. The apparatus for use in lining a conduit or passageway of claim 1, wherein the fluid pressure inlet means is disposed on the downstream side of the tubular body.

* * * * *